Figure 7:
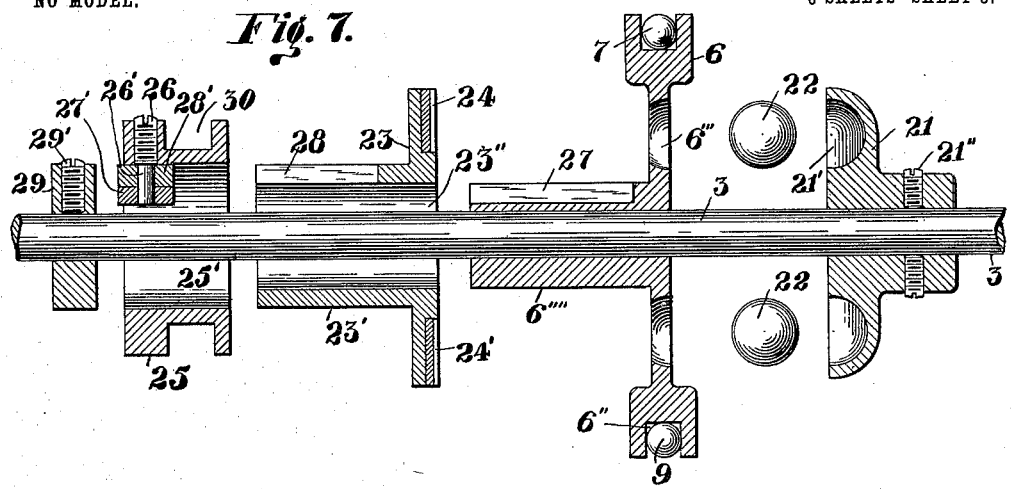

No. 732,933. PATENTED JULY 7, 1903.
J. L. FOLLETT.
TRANSMISSION OF POWER.
APPLICATION FILED OCT. 31, 1902.
NO MODEL. 6 SHEETS—SHEET 1.
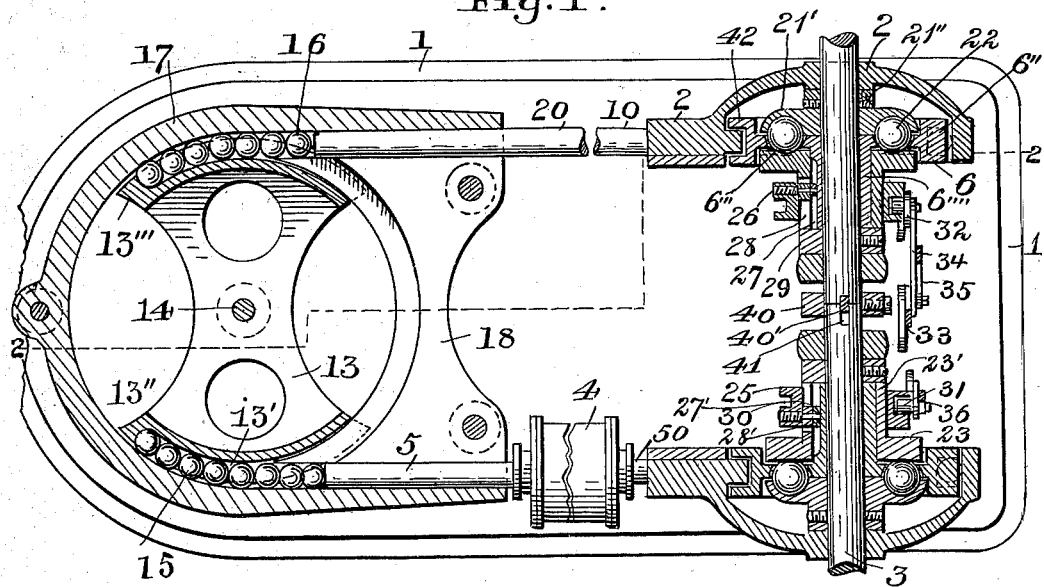
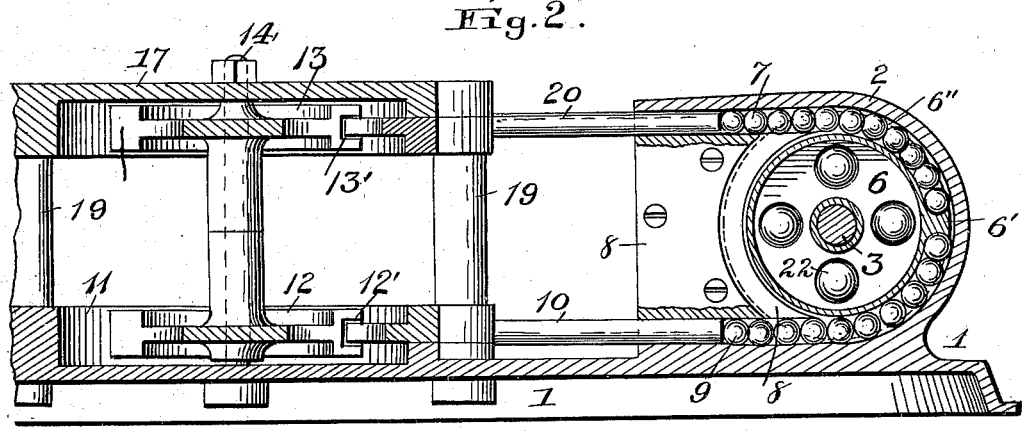
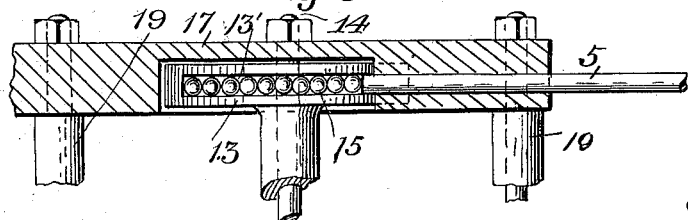
Witnesses
F. L. Ourand
G. F. Stavell
Inventor
Joseph L. Follett
by Marshall Bailey
His Attorney No. 732,933. PATENTED JULY 7, 1903.
J. L. FOLLETT.
TRANSMISSION OF POWER.
APPLICATION FILED OCT. 31, 1902.
NO MODEL. 6 SHEETS—SHEET 2.
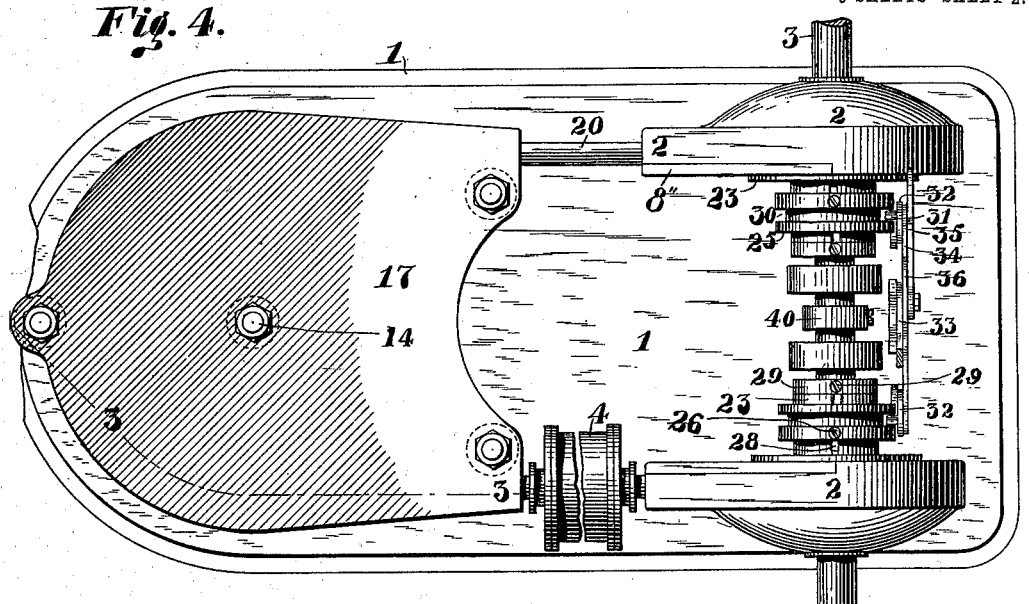
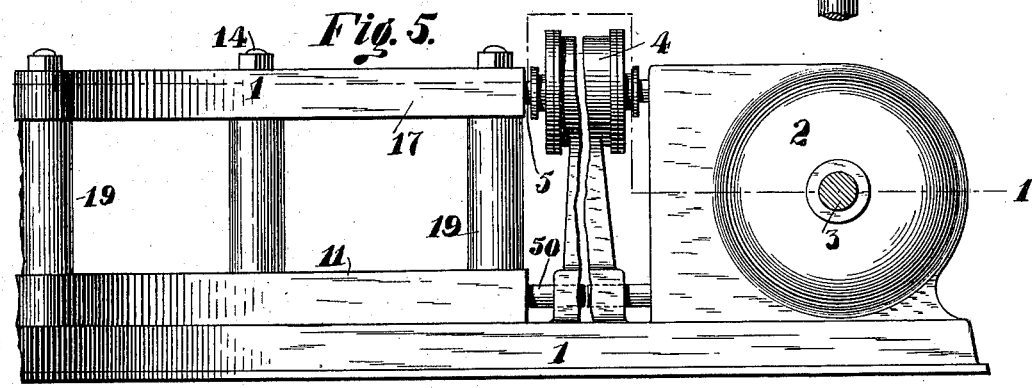
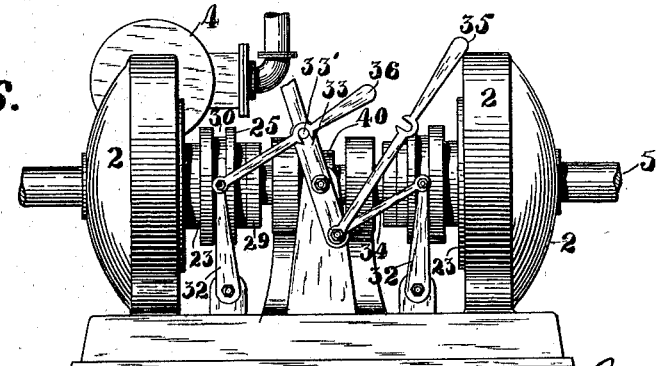
WITNESSES:
J. L. Kornister
J. F. Boudreau
INVENTOR
J. L. Follett
BY
ATTORNEY No. 732,933. PATENTED JULY 7, 1903.
J. L. FOLLETT.
TRANSMISSION OF POWER.
APPLICATION FILED OCT. 31, 1902.
NO MODEL. 6 SHEETS—SHEET 3.

WITNESSES:
J. L. Kornieter
J. F. Boudreau

INVENTOR
J. L. Follett
BY
ATTORNEY

No. 732,933. PATENTED JULY 7, 1903.
J. L. FOLLETT.
TRANSMISSION OF POWER.
APPLICATION FILED OCT. 31, 1902.
NO MODEL. 6 SHEETS—SHEET 4.

WITNESSES:
J. S. Kornicker
J. S. Boudreau

INVENTOR
J. L. Follett
BY
ATTORNEY

THE NORRIS PETERS CO., PHOTO-LITHO., WASHINGTON, D. C.

No. 732,933. PATENTED JULY 7, 1903.
J. L. FOLLETT.
TRANSMISSION OF POWER.
APPLICATION FILED OCT. 31, 1902.
NO MODEL. 6 SHEETS—SHEET 5.

WITNESSES:
J. L. Kornicker
J. F. Boudreau

INVENTOR
J. L. Follett
BY
ATTORNEY

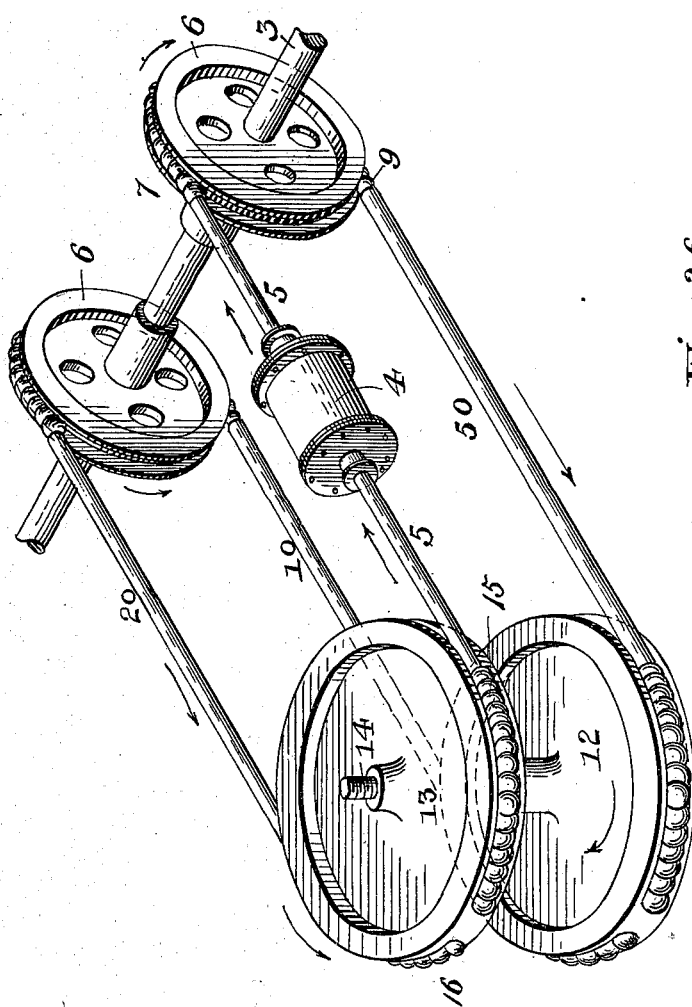

No. 732,933. Patented July 7, 1903.

UNITED STATES PATENT OFFICE.

JOSEPH L. FOLLETT, OF NEW YORK, N. Y., ASSIGNOR TO SPHEROPOLAR ENGINEERING COMPANY, OF NEW YORK, N. Y.

TRANSMISSION OF POWER.

SPECIFICATION forming part of Letters Patent No. 732,933, dated July 7, 1903.

Application filed October 31, 1902. Serial No. 129,582. (No model.)

*To all whom it may concern:*

Be it known that I, JOSEPH L. FOLLETT, a citizen of the United States of America, residing in the borough of Manhattan, city, county, and State of New York, have invented certain new and useful Improvements in Transmission of Power, of which the following is a specification, reference being had therein to the accompanying drawings.

My invention relates to the conversion of reciprocating into rotary motion; and its object is to do this efficiently and as far as possible without loss of power. In the mechanism devised by me for this purpose the reciprocating member—as, for example, the reciprocating piston-rod of a steam-engine—operates directly upon a wheel in a line always tangential to the wheel and through the intermediary of flexible connections which will follow the contour of the wheel and which by pulling or pushing the wheel alternately in opposite directions as the piston-rod reciprocates will oscillate the wheel on its axis. The wheel itself is mounted loosely upon a shaft, with which it has an automatically-operating intermittent grip or clutch connection whereby the oscillating wheel is caused to impart a movement of rotation to the shaft. In practice I have two of these oscillating wheels on the same shaft, both of them operated from the same source and so arranged that the one grips the shaft alternately with the other, thus giving a continuous rotary movement to the shaft.

The foregoing and other features of my invention (relating, among other things, to means for starting, stopping, and reversing the movement of the rotary shaft) will now be described in connection with the accompanying drawings, forming part of this specification, in which I have represented mechanism embodying my improvements in their preferred form, after which I shall point out more particularly in the claims those features which I believe to be new and of my own invention.

Figure 13:
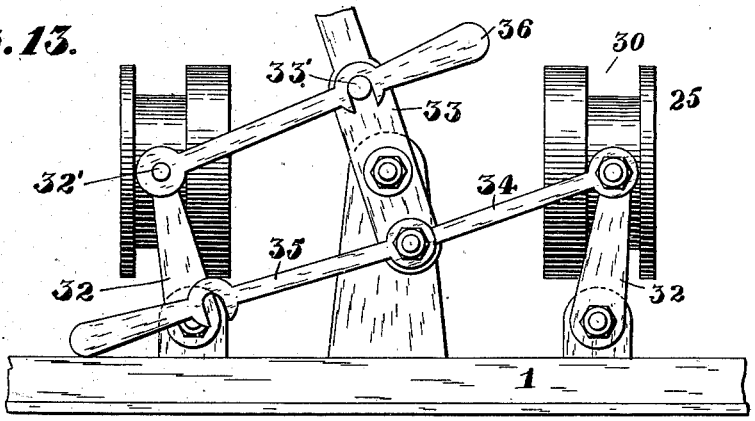
Figure 14:
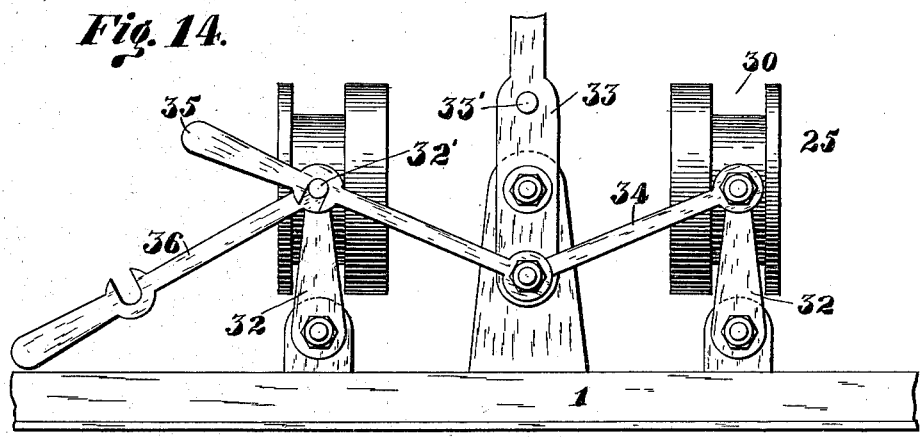
Figure 19:
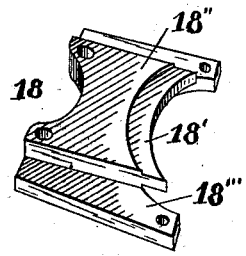
Figure 20:
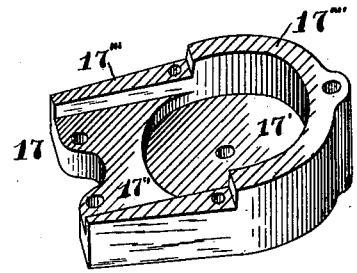
Figure 21:
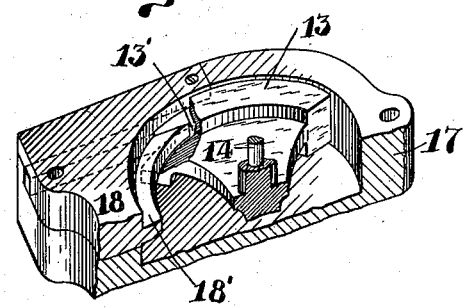
Figure 22:
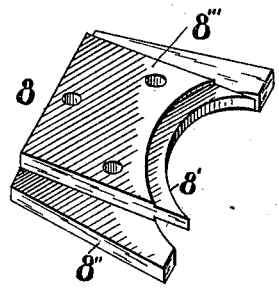
Figure 23:
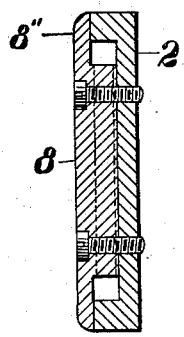
Figure 24:
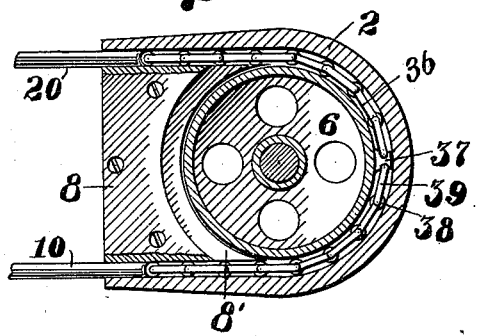
Figure 25:
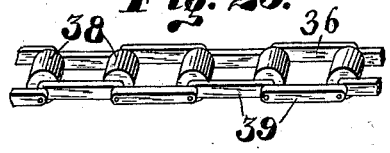

In the drawings, Figure 1 is a sectional view on line 1 1, Fig. 5. Fig. 2 is a sectional view on line 2 2, Fig. 1. Fig. 3 is a sectional view on line 3 3, Fig. 4. Fig. 4 is a plan view of the apparatus. Fig. 5 is a side elevation, and Fig. 6 is an end elevation, of the same. Fig. 7 is an enlarged elevation of the parts of one of the intermittent clutch or grip mechanisms assembled upon the shaft 3, but separated from one another. Figs. 8, 9, 10, 11, and 12 are perspective views of said parts. Figs. 13 and 14 are enlarged elevations of the stopping, starting, and reversing mechanism. Figs. 15, 16, 17, and 18 are detail views showing the two members of the clutch or grip in different positions. Figs. 19, 20, and 21 are views illustrative of the structural details of the casing around wheel 13. Figs. 22 and 23 are like views of the casing around wheel 6. Figs. 24 and 25 are illustrative of a modification hereinafter referred to. Fig. 26 is an enlarged view, mainly diagrammatic, showing the skeleton of the apparatus stripped of detail in order to illustrate the relative arrangement of the two pairs of wheels 6 6 and 12 13 and their connections with one another and the motor.

1 is the base of the apparatus, provided at one end with casings 2, in which is journaled a shaft 3. The motor whose reciprocatory movement is to be converted into rotary movement may be of any suitable type. In this instance it is supposed to be a steam-engine of the reciprocating kind, typified by the steam-cylinder 4, which is to be supplied with steam in the usual way for driving a piston therein, this piston being mounted on a piston-rod 5, which projects through opposite heads of the cylinder. It is from this reciprocatory piston-rod 5 that I seek to revolve shaft 3.

Figure 8:
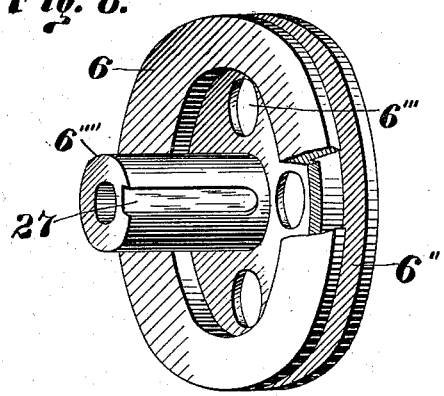
Figure 9:
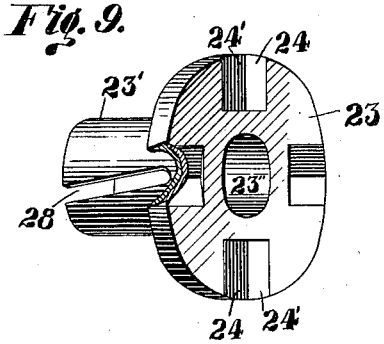
Figure 10:
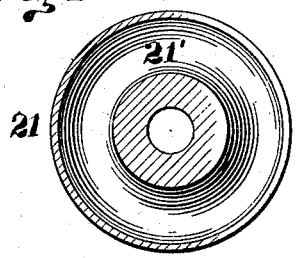
Figure 11:
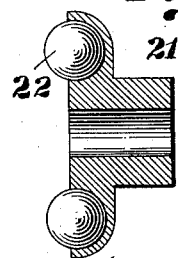
Figure 12:
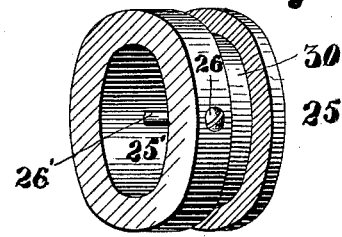

Within each casing 2 and loosely mounted on shaft 3 is a wheel 6, each of said wheels, as seen more plainly in Figs. 2, 7, and 8, having a peripheral runway or groove 6'' with a lug or stop 6' therein and being provided also with one or more holes 6''', for purposes hereinafter mentioned. The two wheels are similarly constructed and have similar connections.

7 represents balls adapted to work in the upper part of the runways 6'' and impinge against one side of lugs 6', and 9 represents similar balls adapted to work in the lower part of runways 6'' and to impinge against the other side of lugs 6'.

8 represents caps having portions 8' adapted to fit in runways 6'', so as to maintain the sets of balls 7 and 9 in proper relation with wheels 6 and forming in conjunction with casings 2 slideways for receiving and supporting one end of the piston-rod 5 and also of the rods 50, 20, and 10.

At the other end of the base 1 are two wheels 12 13, journaled loosely and independently of each other upon a stationary shaft or rod 14 at right angles to the axis of wheels 6, the wheels 6 being in this instance vertical and the wheels 12 13 horizontal. The two wheels 12 13 are of like construction, each being provided with peripheral runways or grooves 12' 13', terminating in lugs 13'' and 13''', respectively, and containing balls 15 16, adapted to work in said runways and impinge against said lugs.

17 and 11 are casings for the wheels 13 and 12, respectively, the upper casing being supported by posts 19. The two casings are of similar construction, one of them being shown in Fig. 20 in perspective, with a central circular recess 17' to receive wheel 13, a seat 17'' for cap 18, Fig. 19, and side ledges 17'''. Cap 18 fits in seat 17'', as indicated in Fig. 21. It has a portion 18'' adapted to fit in the runways 13' of wheel 13 and laterally overhangs 18''', which in conjunction with the side ledges 17''' form the slideways or guide and supporting bearings for the right-hand ends of the rods 5 and 20. (See Fig. 1.) The lower casing 11 and the cap furnish corresponding slideways for the right-hand ends of rods 10 and 50. Under this arrangement it will be noted that each rod 5, 50, 20, and 10 bears at each end against a series of balls, which are thereby held pressed up against the stop-lug in the runway in which they are located. If, therefore, the piston-rod 5 be reciprocated, oscillatory movement of the wheels 6 and 12 13 will be established in the following sequence, reference being had to Fig. 26: In this figure it is supposed that the piston-rod 5 is moving from left to right. In this event the direction of movement of the several parts will be as indicated by the arrows thereon, and it will be noted that the one wheel 6 moves in the reverse direction from the other. The same thing is true when the rod 5 moves in the other direction. Thus the oscillations of the two wheels 6, while synchronous, are opposed in direction, the one wheel rotating from right to left when the other rotates from left to right, and vice versa. It will be noted that under this arrangement there is no crank motion whatever; but the application of power to the parts to be oscillated is direct and always in a line tangential to the wheels to be driven.

I am not limited to the use of sets of balls such as shown. In lieu of these I can employ any suitable motion-transmitting instrumentalities, such as straps, chains, &c. This is illustrated in Figs. 24 and 25, where I substitute for the balls chains 36 of the ordinary sprocket type, (consisting of links 39 and cross connections 38,) these chains being attached at one end to the lug 37 in the runways of wheel 6 and at the other end to their respective rods 10 20. The only difference between the two arrangements is that the wheels are operated in the one case by a push and in the other case by a pull. Indeed, the rods themselves can be dispensed with, (excepting, of course, the piston-rod 5,) and there may be a continuous chain or strap connecting device used instead.

Obviously in order to impart continuous rotary movement to shaft 3 all that is needed is to provide between each of the oscillating wheels 6 and the shaft 3 an intermittent automatic grip mechanism, the two grips on the shaft operating in the same direction, but alternately with respect to one another.

Automatically-operating intermittent grips are known in the art, and various kinds of such devices may be adapted to the particular use I have in view. I have, however, devised and prefer to use for this purpose the mechanism shown in the drawings, more particularly in Figs. 1, 7 to 12, 15 to 18, inclusive, this mechanism permitting the employment of simple and efficient starting, stopping, and reversing gear.

The same grip mechanism is combined with each one of the wheels 6, so that a description of one will answer for both.

Adjoining the outer face of wheel 6 is a disk 21, rigidly fixed to shaft 3 by set-screw 21''. This disk is provided with an annular groove 21' of curved form in cross-section, in which are placed balls 22, the groove accommodating a little more than half of the ball. The holes 6''' in the wheel 6, Figs. 7 and 8, register with the groove 21', and there is one ball for each hole, the balls projecting through the holes to the opposite side of the wheel. The balls form one member of the clutch or grip. The other member is formed by the clutch-disk 23, provided with radial recesses formed each of surfaces 24 24', having a shallow V cross-section, there being one recess for each ball 27' and the ball projecting into its appropriate recess.

Figures 15, 16, 17:
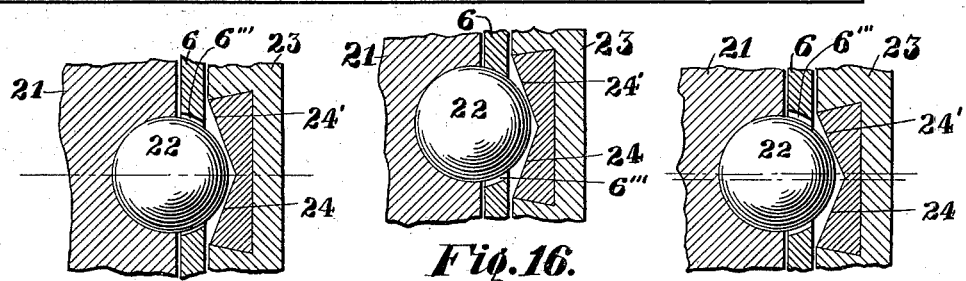
Figure 18:
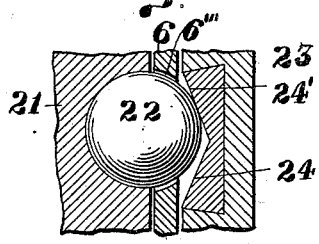

The clutch or grip disk 23 has a hub 23', which fits and can turn upon the hub 6'''' of wheel 6. The hub 6'''' has a straight slot 27 therein. In the hub 23' of the clutch-disk 23 is a slot 28, which is obliquely disposed with reference to slot 27 in wheel 6. Beyond the hubs 23' 6'''' is a collar 29, secured upon the shaft 3 by set-screw 29'. The wheel 6 and clutch-disk are by this collar held up in operative relation to one another and to the disk 21. Upon the hub 23' of the clutch-disk is loosely mounted a sleeve 25, which can slide lengthwise of hub 23', and has a roller-stud 26 26' 27' 28', which projects through the oblique slot 28 of hub 23' into the straight slot 27 of hub 6'''', thus engaging both. Obviously, therefore, by sliding the sleeve 25 lengthwise the wheel 6 and disk 23, by reason of the relative obliquity of the slots 28 27, will be caused to rotate slightly with respect to one another. This movement will cause the V-recesses in the clutch-disk 23 to shift with respect to the balls 22, which project through wheel 6, with the effect of bringing one or the other of the inclined surfaces 24 24', according to the direction of movement of sleeve 25, into such relation to the balls 22 that when the wheel 6 oscillates in one direction the balls will be jammed against such surface, there being at this time a wedge action by which parts 23' 6'''' are forced against the collar 29, with the effect of locking tightly together the two members of the clutch, and thus compelling the shaft 3 to move with that wheel 6 with which the clutch is associated. This is illustrated to some extent diagrammatically in Figs. 15 to 18. In Fig. 15 the V-recess in the clutch-disk 23 is centrally located with respect to the ball 22, as indicated by the straight broken line in said figure. This is the position which the parts occupy when the clutch-disk is in clutched position and the parts are at rest. If under these conditions the engine be started, the wheel 6 will oscillate without imparting any movement whatever to shaft 3, because the clutch-disk is in a position in which it will not be engaged by the ball 22 no matter in what direction the wheel 6 oscillates. This is illustrated in Fig. 16, in which the wheel 6 is supposed to be in movement. There is necessarily a slight clearance between the ball 22 and the hole 6''' in the wheel 6, through which it projects, thus permitting the wheel 6 to move a little at first in either direction independently of the ball; but this clearance is not sufficient to cause the ball to be brought into contact with either one of the faces of the V-recess in the clutch-disk; but if the V-recess in the clutch-disk be moved to one side or the other of the center of the ball, as seen in Fig. 17, then the condition of things is changed. One or the other of the faces of the V-recess is brought into such close relation with the ball that movement of the wheel 6 in one direction will jam the ball in its groove, and thus lock all the parts together. Movement of the wheel 6 in the opposite direction will of course relieve the wedge action and release the clutch by permitting the ball to roll or run in its groove or runway, thus making the grip intermittent.

In order to start, stop, and reverse the movement of shaft 3, it is necessary that the sleeves 25 should be operated in unison. A mechanism for this purpose is illustrated in Fig. 14. In that figure, 33 is the operating lever or handle, pivoted at $a$ to the frame of the machine and connected to upright arms 32 by links 34 35, jointed at one end to the lower end of the operating-lever and at the other end to the upper ends of arms 32. The arms 32 are pivoted at their lower ends to the frame of the machine and at their upper ends are provided with pins or roller-studs 31, Figs. 1, 4, which enter peripheral grooves 30 in the sleeves 25.

In Fig. 14 the lever 33 is shown in its central position, in which position the shaft 3 is motionless. Throwing the lever to one side of its central position will shift the sleeves 25, (and consequently the clutch-disks 23,) so as to cause the continuous revolution of the shaft 3 in one direction. If the lever 33 be thrown to the other side of its central position, this will shift the clutch members into such relation as to cause the shaft 3 to revolve in the opposite direction.

In some instances it may be found desirable to split the shaft 3 in two and rotate each part independently of and in an opposite direction to the other. To this end I can conveniently form the shaft in two sections, as indicated in Fig. 1, connecting the two parts together by a sleeve or bushing 40, secured by set-screw to the shaft and carrying a cross-key 40', which passes through registering slots 41 in the abutting ends of the two shaft-sections, the slot in one of the two sections being of such length as to permit, when desired, the coupling device to be unfastened from the shaft and slid along thereon far enough to carry the coupling-key out from the slot in the other shaft-section. To operate the clutch mechanism for these separate shaft-sections, I may conveniently use a stopping, starting, and reversing gear, such as shown in Fig. 13. This arrangement is the same as that illustrated in Fig. 14, save that one of the swinging arms 32 instead of being connected to the lower end of the operating-lever by a link 35 is connected to the lever above the pivot $a$ of the latter by a link 36, jointed at one end to the arm 32 and at the other end to the lever 33 at 33'. Under this arrangement it will be seen that the sleeves 25 always remain at the same distance apart and always move both in the same direction, the result being that when the operating-lever is moved to either side of its central position the clutch-sleeves will be so shifted that the shaft-sections will be revolved each by a single intermittent grip, but in opposite directions.

I can conveniently combine both arrangements in one, so as to permit either to be used at pleasure, and this is what is illustrated in the drawings. The link 35 is formed as a swinging arm or lever pivoted to the lower end of the operating-lever, having a notch to engage a pin 32' on the left-hand arm 32, in Figs. 13, 14, and a handle by which it may be manipulated, and the link 36 is also formed as a lever-handle, one end of which is hung on the pin 32' of arm 32, while its handle end is provided with a notch which may engage a pin 33' on the lever 33 above the pivot or fulcrum $a$ of the latter.

In Fig. 13, 35 is thrown off and 36 is in engagement. In Fig. 14, 36 is thrown off and 35 is in engagement.

It will be noted that the wheels 12 13 also oscillate synchronously, but in directions opposed to one another. Manifestly, if desired, these wheels also might, like the wheels 6, be provided each with a clutch mechanism to operate in a similar way upon a rotatable shaft common to both.

Having described my invention, what I claim herein as new, and desire to secure by Letters Patent, is—

1. The combination substantially as hereinbefore set forth of a shaft and two wheels mounted loosely thereon; a reciprocatory motor member; flexible connections between the motor member and each wheel, peripherally engaging, and following the contour of, their respective wheels, and arranged and adapted to impart oscillatory movement to said wheels in such manner that the oscillations of the two wheels shall be synchronous but opposed in direction; and automatically operating intermittent grip or clutch mechanisms, whereby each wheel, intermittently and alternately with the other, is connected to, and caused to rotate the shaft.

2. The combination substantially as hereinbefore set forth, of the two wheels 6; a supporting-shaft on which each of the two wheels is loosely mounted; the two wheels 12, 13, arranged upon an axis at right angles with that of the wheels 6; a reciprocating motor, and connections between the motor and the wheels whereby the reciprocations of the motor shall cause the oscillation of the two pairs of wheels, the oscillations of the wheels of each pair being synchronous, but opposed in direction; and automatically operating intermittent clutch or grip mechanisms, one for each wheel 6, whereby each wheel, intermittently and alternately with the other, is connected to, and caused to rotate, the shaft upon which it is mounted.

3. The combination substantially as hereinbefore set forth of a shaft and two wheels mounted loosely thereon; a reciprocatory motor member; flexible connections between the motor member and each wheel, peripherally engaging, and following the contour of, their respective wheels, and arranged and adapted to impart oscillatory movement to said wheels in such manner that the oscillations of the two wheels shall be synchronous but opposed in direction; automatically operating intermittent grip or clutch mechanisms, whereby each wheel, intermittently and alternately with the other, is connected to, and caused to rotate the shaft; and means whereby the rotary movement of the shaft may be stopped, started or reversed at will while the wheels continue to oscillate.

In witness whereof I have hereunto set my hand the 16th day of October, 1902.

J. L. FOLLETT.

In presence of—
  H. V. N. RILEY,
  J. F. BOUDREAU.